(12) United States Patent
Kimsey-Lin et al.

(10) Patent No.: US 11,576,366 B2
(45) Date of Patent: Feb. 14, 2023

(54) AVIAN-DETERRING LIGHTING SYSTEMS AND METHODS FOR AIRCRAFT

(71) Applicant: THE BOEING COMPANY, Chicago, IL (US)

(72) Inventors: Melanie L. Kimsey-Lin, Seattle, WA (US); James A. Fullerton, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 286 days.

(21) Appl. No.: 16/732,605

(22) Filed: Jan. 2, 2020

(65) Prior Publication Data

US 2021/0206510 A1    Jul. 8, 2021

(51) Int. Cl.

| | |
|---|---|
| *B64D 47/06* | (2006.01) |
| *A01M 29/10* | (2011.01) |
| *F21S 43/14* | (2018.01) |
| *F21S 43/16* | (2018.01) |
| *F21Y 105/18* | (2016.01) |
| *F21W 107/30* | (2018.01) |
| *F21Y 115/10* | (2016.01) |
| *B64D 45/00* | (2006.01) |

(52) U.S. Cl.
CPC ............ *A01M 29/10* (2013.01); *B64D 47/06* (2013.01); *F21S 43/14* (2018.01); *F21S 43/16* (2018.01); *B64D 2045/0095* (2013.01); *B64D 2203/00* (2013.01); *F21W 2107/30* (2018.01); *F21Y 2105/18* (2016.08); *F21Y 2115/10* (2016.08)

(58) Field of Classification Search
CPC ................ B64D 47/06; B64D 2203/00; B64D 2045/0095; F21W 2107/30
See application file for complete search history.

(56) References Cited

U.S. PATENT DOCUMENTS

| | | | |
|---|---|---|---|
| 2004/0217364 A1* | 11/2004 | Tarsa | H01L 25/0753 257/89 |
| 2017/0099828 A1* | 4/2017 | Ronning | A01M 29/32 |
| 2017/0263592 A1* | 9/2017 | Schmidt | C09K 11/886 |
| 2018/0000062 A1* | 1/2018 | Khawam | F21S 43/13 |
| 2019/0241278 A1* | 8/2019 | Khawam | F21S 10/06 |

OTHER PUBLICATIONS https://academic.oup.com/condor/advance-article-abstract/doi/10.1093/condor/duz008/5476728.

* cited by examiner

*Primary Examiner* — Eric T Eide
(74) *Attorney, Agent, or Firm* — The Small Patent Law Group LLC; Joseph M. Butscher (57) ABSTRACT

An aircraft and method of deterring avian species from the aircraft include a lighting system including a lighting assembly coupled to the exterior. The lighting assembly includes an ultraviolet (UV) light-emitting element that emits UV light outside of the aircraft.

20 Claims, 7 Drawing Sheets

AVIAN-DETERRING LIGHTING SYSTEMS AND METHODS FOR AIRCRAFT

FIELD OF THE DISCLOSURE

Embodiments of the present disclosure generally relate to avian-deterring lighting systems and methods for aircraft, and, more particularly, to lighting systems and methods for aircraft that are configured to reduce a potential of bird strikes.

BACKGROUND OF THE DISCLOSURE

Aircraft are used to transport passengers and cargo between various locations. Numerous aircraft depart from and arrive at a typical airport every day.

During takeoff and landing, birds may be in close proximity to an aircraft. In certain situations, an aircraft may inadvertently strike one or more birds during a flight, such as during takeoff and landing. As can be appreciated, bird strike potential poses a risk to birds, as well as to aircraft.

SUMMARY OF THE DISCLOSURE

A need exists for a system and a method for deterring birds from aircraft. Further, a need exists for a system and a method that deter birds from aircraft that are taking off and landing.

With those needs in mind, certain embodiments of the present disclosure provide an aircraft including an exterior, and a lighting system including a lighting assembly coupled to the exterior. The lighting assembly includes an ultraviolet (UV) light-emitting element that is configured to emit UV light outside of the aircraft. In at least one embodiment, the UV light includes near UV light. The exterior includes a wing or fuselage of the aircraft.

In at least one embodiment, the UV light-emitting element is configured to emit the UV light during a takeoff phase and a landing phase of a flight of the aircraft.

As a further example, the lighting system includes a UV light control unit in communication with the UV light-emitting element. The UV light control unit is configured to control operation of the UV light-emitting element. For example, the UV light control unit is configured to operate the UV light-emitting element in an active state when the aircraft is below a UV light activation threshold. As another example, the UV light control unit is configured to operate the UV light-emitting element in an active state when landing gear of the aircraft is deployed. As another example, the UV light control unit is configured to operate the UV light-emitting element to flicker the UV light-emitting element at a predetermined frequency.

In at least one embodiment, the UV light-emitting element is configured to emit the UV light away from the exterior, and/or onto a portion of the exterior.

In at least one embodiment, the lighting assembly also includes at least one visible light-emitting element. In at least one embodiment, the lighting assembly also includes a phosphor coating disposed over the UV light-emitting element. The phosphor coating is configured to down-convert the UV light emitted by the UV light-emitting element so that a first portion of light emitted from the lighting assembly is visible light and a second portion of the light is the UV light.

Certain embodiments of the present disclosure provide a method of deterring birds from an aircraft. The method includes coupling a lighting assembly of a lighting system including an ultraviolet (UV) light-emitting element to an exterior of the aircraft, and emitting UV light from the UV light-emitting element outside of the aircraft. As an example, said emitting includes emitting the UV light during a takeoff phase and a landing phase of a flight of the aircraft.

In at least one embodiment, the method includes communicatively coupling a UV light control unit with the UV light-emitting element, and controlling, by the UV light control unit, the UV light-emitting element. As an example, said controlling includes operating the UV light-emitting element in an active state when the aircraft is below a UV light activation threshold, and/or landing gear of the aircraft is deployed.

In at least one embodiment, said emitting includes one or both of emitting the UV light away from the exterior, and/or emitting the UV light onto a portion of the exterior.

In at least one embodiment, the method also includes emitting visible light from a visible light-emitting element of the lighting assembly. In at least one embodiment, the method includes disposing a phosphor coating over the UV light-emitting element, and down-converting, by the phosphor coating, the UV light emitted by the UV light-emitting element so that a first portion of light emitted from the lighting assembly is visible light and a second portion of the light is the UV light.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a lighting system and method for an aircraft that includes a lighting assembly that emits ultraviolet (UV) light that alerts or otherwise deters avian species from approaching the aircraft. UV light, such as near UV light, is visible to various avian species. Accordingly, the lighting assembly is active during certain phases of a flight of the aircraft, such as during takeoff and landing, thereby being visible to birds, which thereby alerts or otherwise deters birds from approaching the aircraft.

In at least one embodiment, the lighting system includes a lighting assembly that can replace an existing light (such as a landing light) coupled to an exterior of the aircraft. The lighting assembly includes at least one UV light-emitting element (such as a light-emitting diode) that emits UV light. In at least one embodiment, the UV light-emitting element is configured to emit UV light at a near UV light wavelength. It has been found that near UV light significantly reduces bird collisions, due to near UV light being visible by most, if not all, avian species. For example, studies related to emission of near UV light within a range of 380-395 nm to illuminate power lines near migratory stopover locations in Nebraska exhibited a 98% reduction in bird collisions with the power lines. As another example, studies have shown bird strikes are 7 times more common at night than during the daytime. Utilization of UV light illumination by and/or of the aircraft at night, when the aircraft is the only source of UV light, would provide enhanced awareness to birds compared to visible light only, thereby reducing the risk of a collision.

A phosphor coating can extend over the UV light-emitting element. The phosphor coating is configured to down-convert at least a portion of the emitted UV light to visible light (such as white light, red light, orange light, yellow light, green light, blue light, indigo light, violet light, or any mixture therebetween), and allow at least some of the emitted UV light to escape through the phosphor coating.

As described herein, certain embodiments of the present disclosure provide an aircraft including an exterior, and a lighting system including a lighting assembly coupled to the exterior. The lighting assembly includes an ultraviolet (UV) light-emitting element that is configured to emit UV light outside of the aircraft. As such, avian species are able to see the emitted UV light, and therefore avoid the aircraft.

Figure 1:
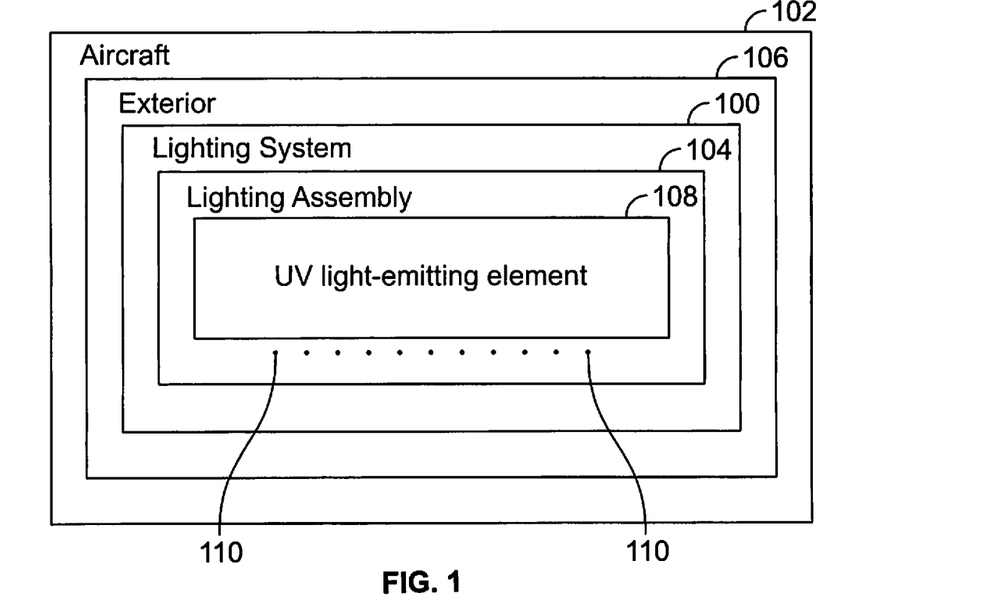
FIG. 1 illustrates a schematic diagram of a lighting system of an aircraft, according to an embodiment of the present disclosure.

FIG. 1 illustrates a schematic diagram of a lighting system 100 of an aircraft 102, according to an embodiment of the present disclosure. The lighting system 100 includes a lighting assembly 104 coupled to an exterior 106 of the aircraft 102. That is, the lighting assembly 104 is an exterior lighting assembly of the aircraft 102. For example, the lighting assembly 104 is mounted to the exterior 106 of the aircraft 102. As another example, the lighting assembly 104 integrally forms a portion of the exterior the aircraft 102.

In at least one embodiment, the lighting assembly 104 is coupled to a wing of the aircraft 102. For example, the lighting assembly 104 is coupled to a leading edge of the wing. In at least one embodiment, the lighting assembly 104 replaces a landing light of a wing of the aircraft 102.

In at least one embodiment, the lighting assembly 104 is coupled to a fuselage of the aircraft 102. For example, the lighting assembly is coupled to a nose of the fuselage. As another example, the lighting assembly 104 is coupled to an underside of the fuselage. In at least one embodiment, the lighting assembly 104 replaces a runway light on a nose of the aircraft 102. In general, the lighting assembly 104 can be coupled to various portions of the exterior 106, such as a wing, an empennage, a fuselage, stabilizers, or the like. As another example, the lighting assembly 104 can be coupled to a landing gear of the aircraft 102.

The lighting assembly 104 includes at least one ultraviolet (UV) light-emitting element 108. For example, the UV light-emitting element 108 is a UV light-emitting diode (LED) that is configured to emit UV light 110. Optionally, the UV light-emitting element 108 can be various other types of elements, such as lamps, bulbs, light discharge devices, or the like, that are configured to emit the UV light 110.

The UV light-emitting element 108 emits the UV light 110 outside of the aircraft 102. That is, the UV light-emitting element 108 emits the UV light 110 to be visible outside of the aircraft 102. In this manner, the UV light 110 is visible to avian species outside of the aircraft 102.

In at least one embodiment, the UV light-emitting element 108 emits the UV light 110 within a near UV light spectrum. For example, the UV light 110 is emitted over a range of between 200 nm-400 nm. It has been found that UV light in the near UV light spectrum is visible to many, if not all, avian species. Accordingly, birds are able to see the emitted UV light 110 and, as such, tend to avoid the UV light 110, and therefore the aircraft 102.

In operation, the UV light-emitting element 108 emits the UV light 110 during one or more phases of flight of the aircraft 102. For example, the UV light-emitting element 108 emits the UV light 110 during takeoff and landing phases of the aircraft 102. In this manner, the UV light 110 emitted by the UV light-emitting element 108 is visible to birds, which, in turn, avoid the UV light 110, and therefore reduce a potential of the aircraft 102 striking the birds.

Figure 2:
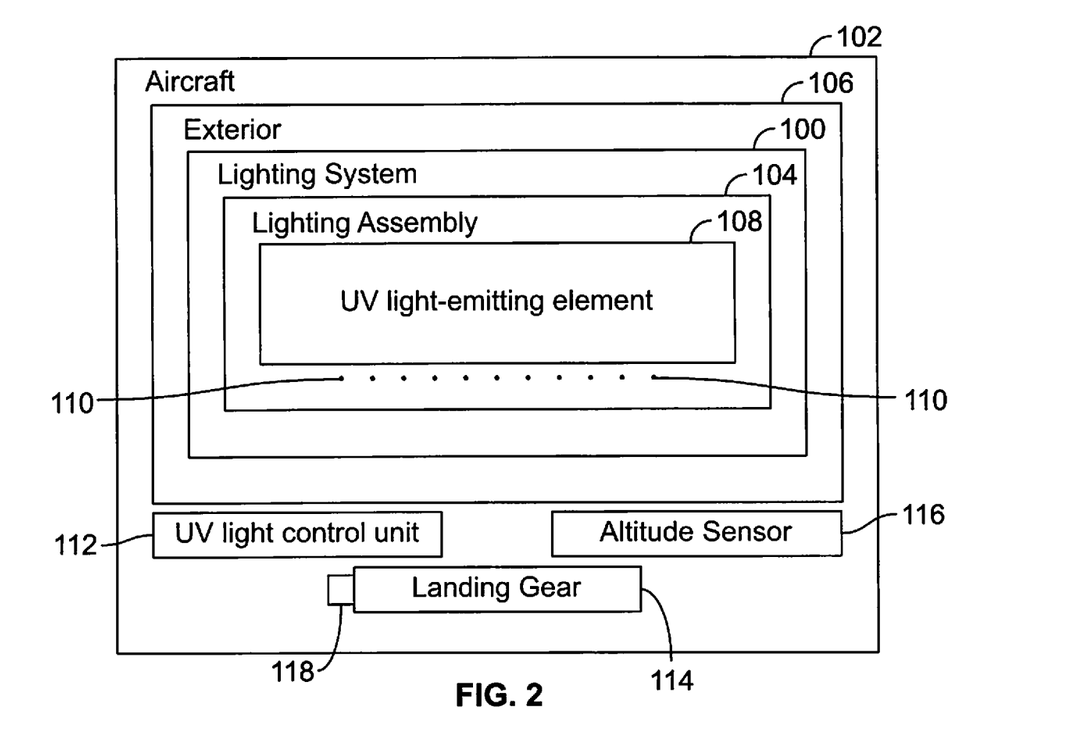
FIG. 2 illustrates a schematic diagram of a lighting system of an aircraft, according to an embodiment of the present disclosure.

FIG. 2 illustrates a schematic diagram of the lighting system 100 of the aircraft 102, according to an embodiment of the present disclosure. In at least one embodiment, the lighting system 100 includes a UV light control unit 112 that is in communication with the UV light-emitting element 108, such as through one or more wired or wireless connections, and is configured to control operation thereof.

The UV light control unit 112 selectively activates and deactivates the UV light-emitting element 108. For example, the UV light control unit 112 activates the UV light-emitting element 108 during predetermined phases of flight of the aircraft 102, such as during takeoff and landing. The UV light control unit 112 determines when to activate the UV light-emitting element 108 such as by detecting an altitude of the aircraft 102, and/or when landing gear 114 of the aircraft is deployed.

For example, in at least one embodiment, the UV light control unit 112 is in communication with an altitude sensor 116, such an altimeter, through one or more wired or wireless connections. The UV light control unit 112 activates the UV light-emitting element 108 when the altitude of the aircraft 102 is below a particular predetermined altitude threshold, which can be associated with a takeoff and landing phases of the aircraft 102. The UV light control unit 112 can deactivate the UV light-emitting element 108 when the altitude of the aircraft 102 is above predetermined altitude threshold.

As another example, in at least one embodiment, the UV light control unit 112 is in communication with a sensor 118 coupled to the landing gear 114, such as through one or more wired or wireless connections. The sensor 118 detects when the landing gear 114 is deployed, such as during takeoff and landing. In this manner, when the UV light control unit 112 detects that the landing gear 114 is deployed (whether via signals received from the sensor 118, and/or from a flight computer of the aircraft 102), the UV light control unit 112 activates (and maintains activation of) the UV light-emitting element 108. When the UV light control unit 112 detects that the landing gear 114 is not deployed (for example, retracted), the UV light control unit 112 can maintain the UV light-emitting element 108 in a deactivated state.

In at least one embodiment, the UV light control unit 112 operates the UV light-emitting element 108 to intermittently emit or flicker the UV light 110 at a predetermined frequency. The intermittent emission or flickering of the UV light 110 may be highly visible to and repel various avian species.

Figure 3:
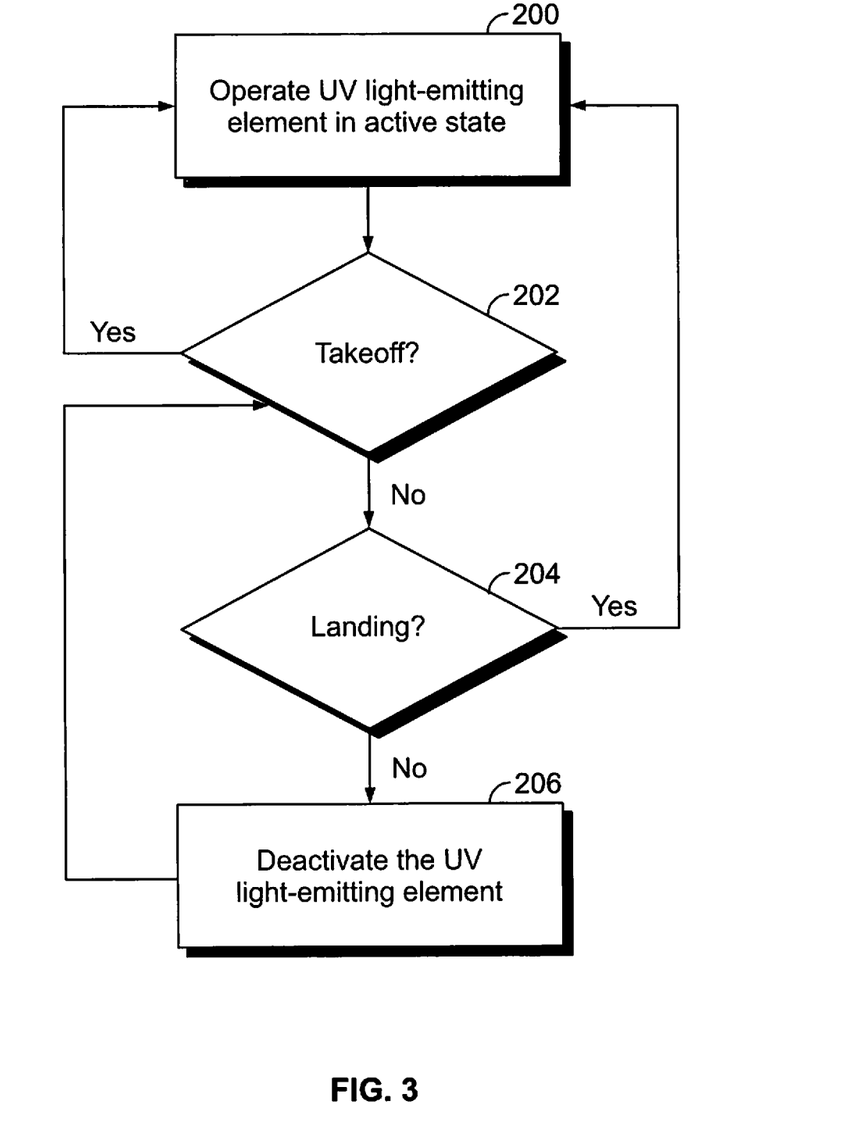
FIG. 3 illustrates a flow chart of a method of operating a lighting system of an aircraft, according to an embodiment of the present disclosure.

FIG. 3 illustrates a flow chart of a method of operating a lighting system of an aircraft, according to an embodiment of the present disclosure. Referring to FIGS. 2 and 3, at 200, the UV light control unit 112 operates the UV light-emitting element 108 of the lighting system 100 of the aircraft 102 in an active state, so that the UV-light emitting element 108 emits the UV light 110 outside of the aircraft 102. At 202, the UV light control unit 112 determines if the aircraft 102 is in a takeoff phase of flight, such as through communication with one or more of the altitude sensor 116, the landing gear 114, a flight computer, and/or the like. If the aircraft 102 is in a takeoff phase, the method returns to 200, at which the UV light control unit 112 continues to operate the UV light-emitting element 108 in the active state.

If, however, the aircraft 102 is not in the takeoff phase, the UV light control unit 112 determines if the aircraft 102 is in a landing phase at 204, such as through communication with the altitude sensor 116, the landing gear 114, the flight computer, and/or the like. If the aircraft 102 is in the landing phase, the method returns to 200, at which UV light control unit 112 continues to operate the UV light-emitting element 108 in the active state.

If, however, the aircraft 102 is not in the takeoff phase or the landing phase, the method proceeds from 204 to 206, at which the UV light control unit 112 deactivates the UV light-emitting element 108, and the method returns to 202. In at least one embodiment, the method begins at 206, in which the UV light-emitting element 108 is in a deactivated state, and the method proceeds to 202, as described.

Optionally, the lighting system 100 does not include the UV light control unit 112. Instead, the UV light-emitting element 108 can be selectively activated and deactivated by flight personnel, continuously operational, or the like.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the UV light control unit 112 can be or include one or more processors that are configured to control operation thereof, as described herein.

The UV light control unit 112 is configured to execute a set of instructions that are stored in one or more data storage units or elements (such as one or more memories), in order to process data. For example, the UV light control unit 112 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the UV light control unit 112 as a processing machine to perform specific operations such as the methods and processes of the various embodiments of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of embodiments herein can illustrate one or more control or processing units, such as the UV light control unit 112. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the UV light control unit 112 can represent processing circuitry such as one or more of a field programmable gate array (FPGA), application specific integrated circuit (ASIC), microprocessor(s), and/or the like. The circuits in various embodiments can be configured to execute one or more algorithms to perform functions described herein. The one or more algorithms can include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and nonvolatile RAM (NVRAM) memory. The above data storage unit types are exemplary only, and are thus not limiting as to the types of memory usable for storage of a computer program.

Figure 4:
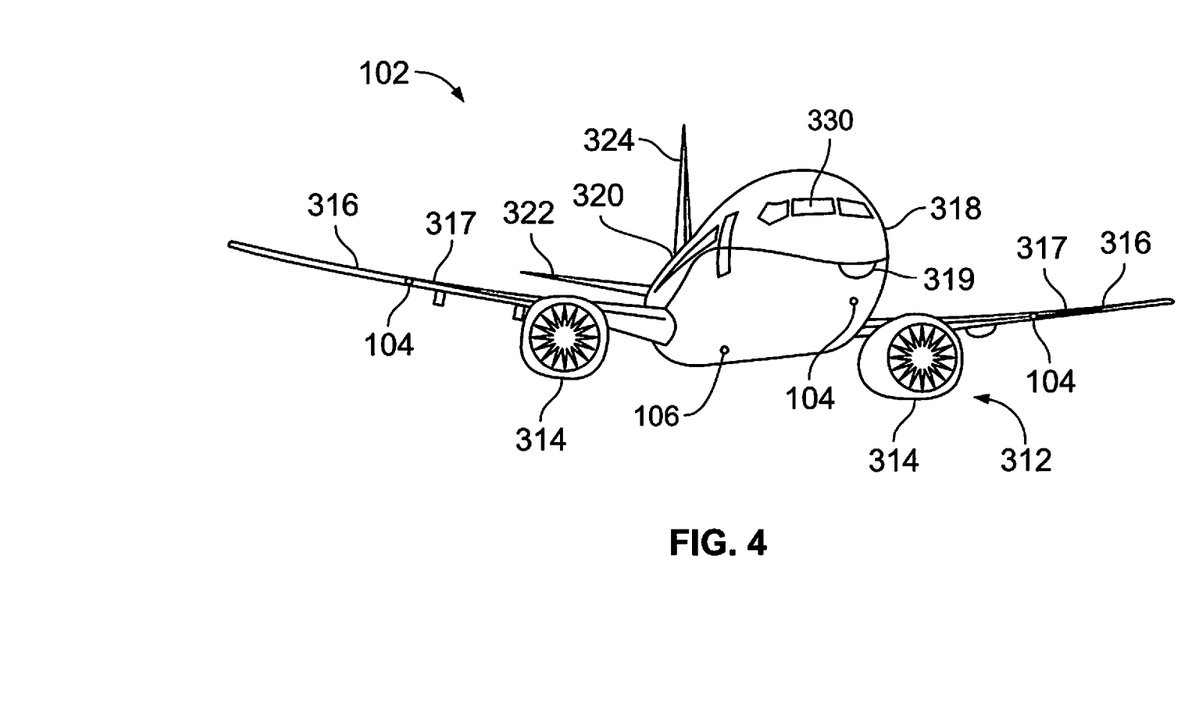
FIG. 4 illustrates a front perspective view of an aircraft, according to an exemplary embodiment of the present disclosure.

FIG. 4 illustrates a front perspective view of the aircraft 102, according to an exemplary embodiment of the present disclosure. The aircraft 102 includes a propulsion system 312 that can include two engines 314, for example. Optionally, the propulsion system 312 can include more engines 314 than shown. The engines 314 are carried by wings 316 of the aircraft 102. In other embodiments, the engines 314 can be carried by a fuselage 318 and/or an empennage 320. The empennage 320 can also support horizontal stabilizers 322 and a vertical stabilizer 324. The fuselage 318 of the aircraft 102 defines an internal cabin, which can include a cockpit 330, one or more work sections (for example, galleys, personnel carry-on baggage areas, and the like), and/or one or more passenger sections.

As described, the aircraft 102 includes one or more lighting assemblies 104 coupled to an exterior 106. For example, the wings 316 include lighting assemblies 104, such as at leading edges 317. The fuselage 318 includes a lighting assembly 104, such as at or proximate a nose 319. The aircraft 102 can include more or less lighting assemblies 104 than shown.

In at least one embodiment, the lighting assemblies 104 emit the UV light away from the aircraft 102, such as similar to headlights. In at least one other embodiment, at least some of the lighting assemblies emit at least a portion of the UV light onto a portion of the exterior 106, so as to illuminate the portion of the exterior 106.

Figure 5:
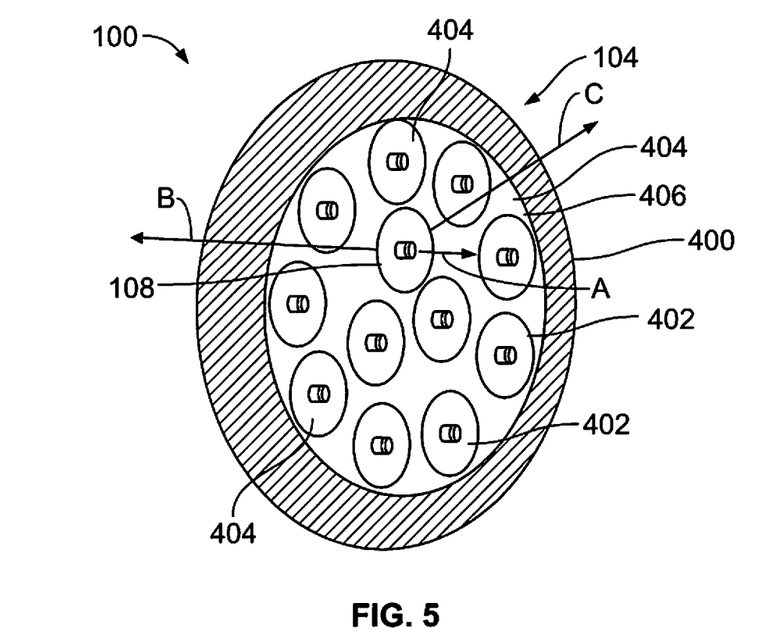
FIG. 5 illustrates a front perspective view of a lighting assembly of a lighting system, according to an embodiment of the present disclosure.

FIG. 5 illustrates a front perspective view of a lighting assembly 104 of the lighting system 100, according to an embodiment of the present disclosure. The lighting assembly 104 includes a housing 400 that retains a plurality of light-emitting elements 402. In at least one embodiment, the light-emitting elements 402 are LEDs. A transparent cover or lens 404 secures to the housing 400 over the light-emitting elements 402.

At least one of the light-emitting elements 402 is a UV light-emitting element 108. In at least one embodiment, all of the light-emitting elements 402 are UV light-emitting elements 108. Optionally, at least some of the UV light-emitting elements 108 are visible light-emitting elements 404 that are configured to emit visible light, such as white light, red light, orange light, yellow light, green light, blue flight, indigo light, violet light, and/or any mixture therebetween. In such an embodiment, the lighting assembly 104 is configured to emit both visible light and UV light.

In at least one embodiment, a phosphor coating 406 is mounted onto the lens 404 and/or over the light-emitting elements 402. The phosphor coating 406 down-converts emitted light to different wavelengths. For example, the phosphor coating 406 down-converts emitted UV light from the UV-light emitting element 108 to visible light. The phosphor coating 406 is configured to convert only a portion of the emitted UV light to visible light, and allow a remaining portion of the emitted UV light to pass through the lens 404, thereby allowing UV light to be emitted out of the lighting assembly 104.

In at least one embodiment, the UV light-emitting element(s) 108 are oriented to emit the UV light in a forward direction A. As such, the UV light is emitted away from an exterior 106 of the aircraft 102 (shown in FIGS. 1 and 2). In at least one other embodiment, the UV light-emitting element(s) 108 are oriented to emit the UV light in a radial direction B and/or C. The forward direction A may be normal or perpendicular to the radial direction B and/or C. UV light emitted in the radial direction B and/or C is emitted onto the exterior 106 of the aircraft 102. In at least one embodiment, the lighting assembly 100 is configured emit the UV light in the forward direction A as well as the radial direction B and/or C, such as via one or more UV light-emitting elements 108.

Figure 6:
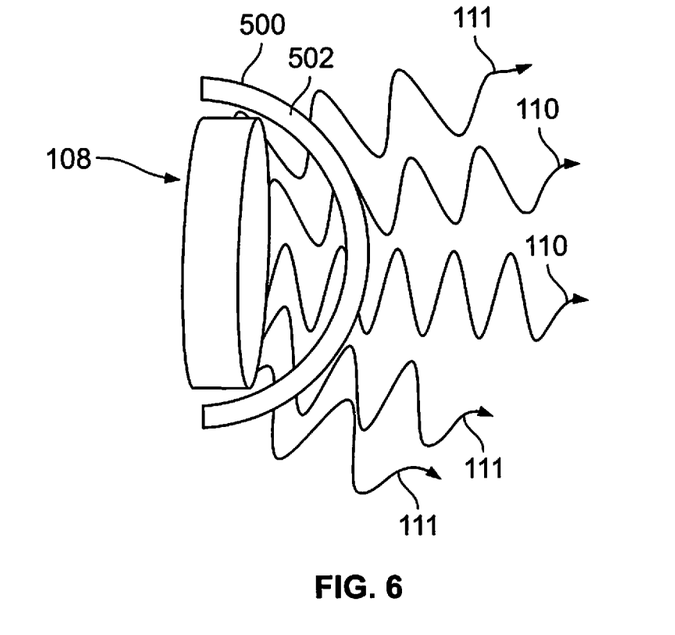
FIG. 6 illustrates a lateral perspective view of an ultraviolet (UV) light-emitting element, according to an embodiment of the present disclosure.

FIG. 6 illustrates a lateral perspective view of an ultraviolet (UV) light-emitting element 108, according to an embodiment of the present disclosure. In at least one embodiment, the UV light-emitting element 108 includes a phosphor coating 500, such as may be disposed over, under, and/or within a lens or cover 502. The phosphor coating 500 down-converts a portion of the UV light 110 to visible light 111, while allowing a remaining portion of the UV light 110 to pass therethrough. For example, the phosphor coating 500 can be 70-80% efficient, thereby resulting in a significant amount of UV light 110 to pass therethrough. In this manner, a UV light-emitting element 108 having the phosphor coating 500 emits both UV light 110, as well as the visible light 111.

Figure 7:
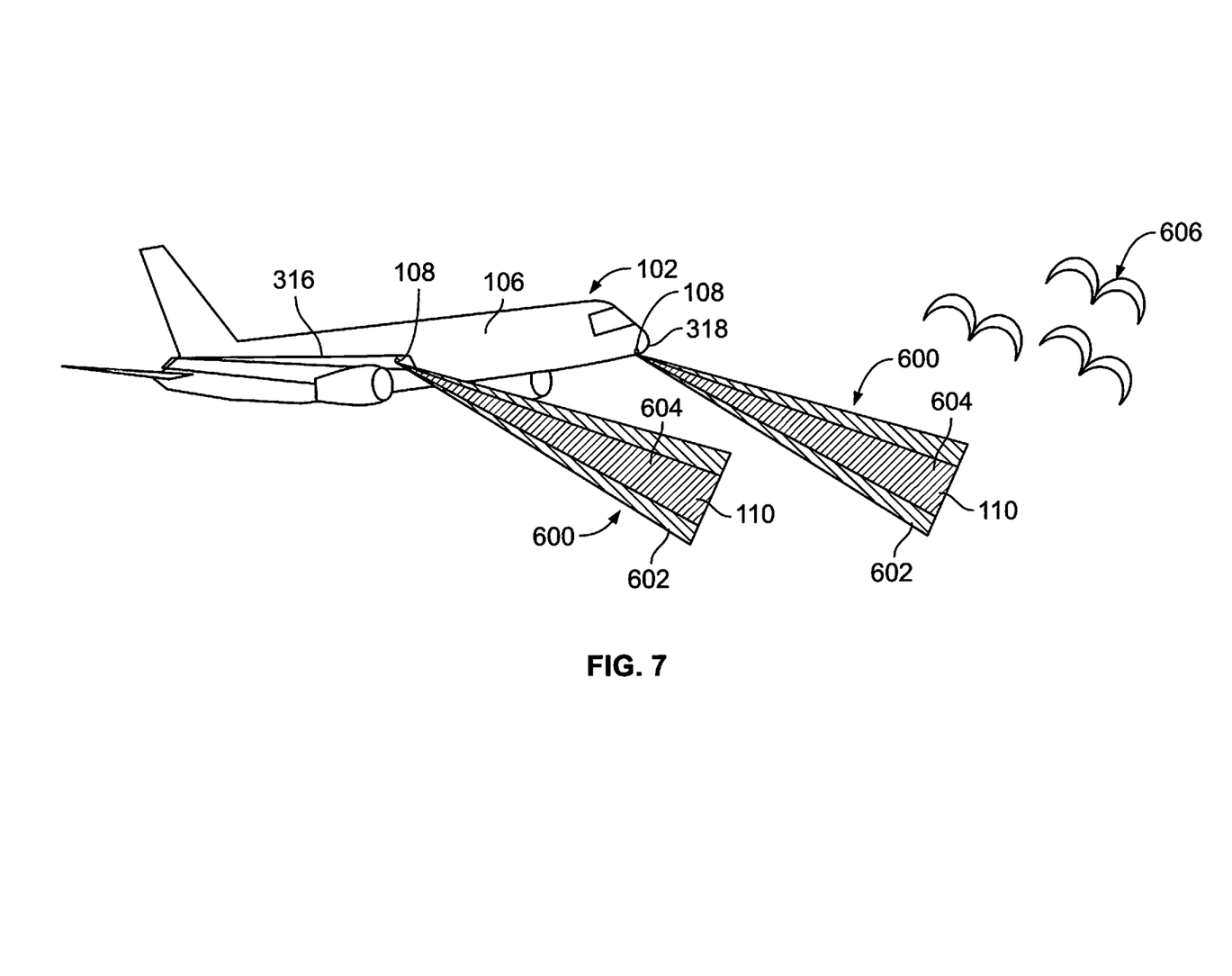
FIG. 7 illustrates a lateral view of the aircraft emitting light from lighting assemblies coupled to an exterior, according to an embodiment of the present disclosure.

FIG. 7 illustrates a lateral view of the aircraft 102 emitting light 600 from lighting assemblies 104 coupled to an exterior 106, according to an embodiment of the present disclosure. The lighting assemblies 104 can be coupled to the wings 316 and the fuselage 318. The lighting assemblies 104 emit the light 600, which includes a first portion 602 that is visible to humans, and a second portion 604 that is or includes the UV light (such as near UV light), which is invisible to humans, but highly visible to birds 606 and alerts or otherwise deters the birds from approaching the aircraft 102.

Figure 8:
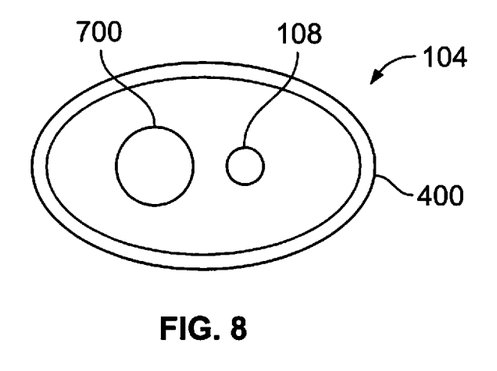
FIG. 8 illustrates a front view of a lighting assembly, according to an embodiment of the present disclosure.

FIG. 8 illustrates a front view of a lighting assembly 104, according to an embodiment of the present disclosure. The lighting assembly 104 includes a UV light-emitting element 108 and a visible light-emitting element 700, The UV light-emitting element 108 is configured to emit UV light, while the visible light-emitting element 700 is configured to emit visible light (that is, wavelengths visible to humans). The UV light-emitting element 108 and the visible light-emitting element 700 are contained within the housing 400, such as that of a landing light or a runway light of an aircraft. The lighting assembly 104 can include more UV light-emitting elements 108 and/or more visible light-emitting elements 700 than shown.

Figure 9:
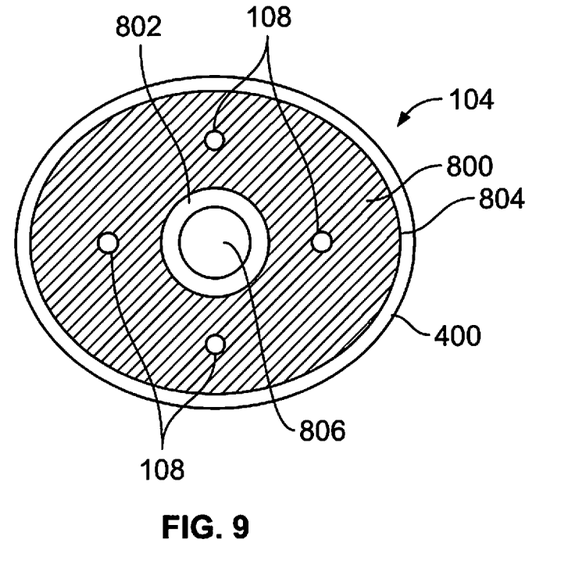
FIG. 9 illustrates a front view of a lighting assembly, according to an embodiment of the present disclosure.

FIG. 9 illustrates a front view of a lighting assembly 104, according to an embodiment of the present disclosure. In this embodiment, a phosphor coating 800 is disposed over one or more UV light-emitting elements 108. A transparent passage 802 is formed in a lens 804. The transparent passage 802 can be a portion of the lens 804 that does not include the phosphor coating 800. The transparent passage 802 is formed over the one or more visible light-emitting elements 806. The lighting assembly 104 can include more or less UV light-emitting elements 108 and visible light-emitting elements 806 than shown.

Figure 10:
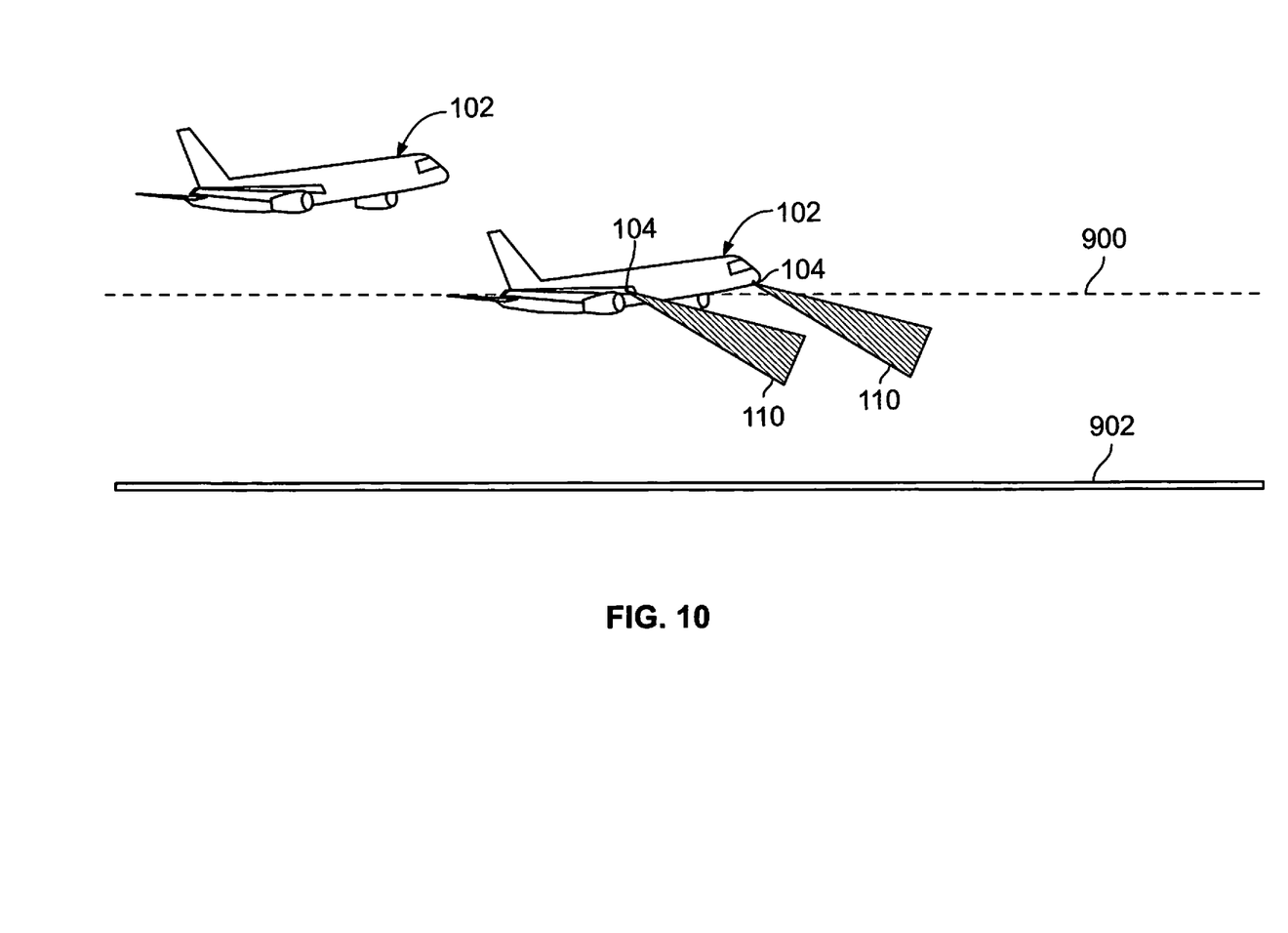
FIG. 10 illustrates a simplified lateral view of aircraft in relation to a UV light activation threshold, according to an embodiment of the present disclosure.

FIG. 10 illustrates a simplified lateral view of aircraft 102 in relation to a UV light activation threshold 900, according to an embodiment of the present disclosure. It is to be understood that FIG. 10 is not drawn to scale. The UV light activation threshold 900 is an example of a predetermined altitude threshold. The UV light activation threshold 900 is a predetermined altitude below which the lighting assemblies 104 emit the UV light 110. Referring to FIGS. 2, 3, and 10, the UV light control unit 112 operates the UV light-emitting elements 108 in an active state when the aircraft 102 is at and below UV light activation threshold 900. In at least one embodiment, the UV light-emitting elements 108 are deactivated when the aircraft 102 is above the UV light activation threshold 900.

In at least one embodiment, the UV light activation threshold 900 is between 10,000-18,000 feet above ground 902. It has been found that bird strikes occur at altitudes of 3500 feet and below above the ground 902. Accordingly, by ensuring that the UV light-light emitting elements 108 emit the UV light 110 at an altitude between the ground 902 and well above such known bird-strike altitudes, the potential of bird strikes with the aircraft is substantially reduced.

As described herein, embodiments of the present disclosure provide systems and methods for deterring birds from aircraft. Further, embodiments of the present disclosure provide systems and methods that deter birds from aircraft that are taking off and landing.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft comprising:
   an exterior; and
   a lighting system comprising a lighting assembly coupled to the exterior, wherein the lighting assembly includes:
      a housing;
      at least one an ultraviolet (UV) light-emitting element retained within the housing, the at least one UV light-emitting element configured to emit UV light outside of the aircraft;
      at least one visible light-emitting element retained within the housing, wherein the at least one visible light-emitting element is separate and distinct from the at least one UV light-emitting element, the at least one visible light-emitting element configured to emit visible light outside of the aircraft; and
      a lens secured to the housing over the at least one UV light-emitting element and the at least one visible light-emitting element.

2. The aircraft of claim 1, wherein the UV light comprises near UV light.

3. The aircraft of claim 1, wherein the exterior comprises a wing or fuselage of the aircraft.

4. The aircraft of claim 1, wherein the at least one UV light-emitting element is configured to emit the UV light during a takeoff phase and a landing phase of a flight of the aircraft.

5. The aircraft of claim 1, wherein the lighting system further comprises a UV light control unit in communication with the at least one UV light-emitting element, wherein the UV light control unit is configured to control operation of the at least one UV light-emitting element.

6. The aircraft of claim 5, wherein the UV light control unit is configured to operate the at least one UV light-emitting element in an active state when the aircraft is below a UV light activation threshold.

7. The aircraft of claim 5, wherein the UV light control unit is configured to operate the at least one UV light-emitting element in an active state when landing gear of the aircraft is deployed.

8. The aircraft of claim 5, wherein the UV light control unit is configured to operate the at least one UV light-emitting element to flicker the at least one UV light-emitting element at a predetermined frequency.

9. The aircraft of claim 1, wherein the at least one UV light-emitting element is configured to emit the UV light away from the exterior.

10. The aircraft of claim 1, wherein the at least one UV light-emitting element is configured to emit the UV light onto a portion of the exterior.

11. The aircraft of claim 1, wherein the lighting assembly further comprises a phosphor coating disposed over the at least one UV light-emitting element, wherein the phosphor coating is configured to down-convert the UV light emitted by the at least one UV light-emitting element so that a first portion of light emitted from the lighting assembly is also visible light and a second portion of the light is the UV light.

12. A method of deterring birds from an aircraft, the method comprising:
   coupling a lighting assembly of a lighting system to an exterior of the aircraft, wherein the lighting assembly includes:
      a housing;
      at least one an ultraviolet (UV) light-emitting element retained within the housing, the at least one UV light-emitting element configured to emit UV light outside of the aircraft;

at least one visible light-emitting element retained within the housing, wherein the at least one visible light-emitting element is separate and distinct from the at least one UV light-emitting element, the at least one visible light-emitting element configured to emit visible light outside of the aircraft; and a lens secured to the housing over the at least one UV light-emitting element and the at least one visible light-emitting element; and emitting the UV light from the at least one UV light-emitting element outside of the aircraft; and emitting the visible light from the at least one visible light-emitting element outside of the aircraft.

13. The method of claim 12, wherein the UV light comprises near UV light.

14. The method of claim 12, wherein said emitting comprises emitting the UV light during a takeoff phase and a landing phase of a flight of the aircraft.

15. The method of claim 12, further comprising:
communicatively coupling a UV light control unit with the at least one UV light-emitting element; and
controlling, by the UV light control unit, the at least one UV light-emitting element.

16. The method of claim 15, wherein said controlling comprises operating the at least one UV light-emitting element in an active state when the aircraft is below a UV light activation threshold, or landing gear of the aircraft is deployed.

17. The method of claim 12, wherein said emitting comprises one or both of emitting the UV light away from the exterior, or emitting the UV light onto a portion of the exterior.

18. The method of claim 12, further comprising:
disposing a phosphor coating over the at least one UV light-emitting element; and
down-converting, by the phosphor coating, the UV light emitted by the at least one UV light-emitting element so that a first portion of light emitted from the lighting assembly is also visible light and a second portion of the light is the UV light.

19. The aircraft of claim 1, wherein the lighting assembly is configured to:
emit only UV light through the lens and outside of the aircraft;
emit only visible light through the lens and outside of the aircraft; and
emit both the UV light and the visible light at the same time through the lens and outside of the aircraft.

20. The aircraft of claim 1, wherein the lighting assembly is configured to emit the UV light in a forward direction away from any portion of the aircraft.

* * * * *